(12) United States Patent
Contino et al.

(10) Patent No.: US 9,547,653 B1
(45) Date of Patent: Jan. 17, 2017

(54) WIRELESS DRIVE FILE BACKUP

(75) Inventors: Jeffrey R. Contino, Shawnee, KS (US); Warren B. Cope, Olathe, KS (US); Douglas Alan Olding, Overland Park, KS (US)

(73) Assignee: Spring Communications Company L.P., Overland Park, KS (US)

( * ) Notice: Subject to any disclaimer, the term of this patent is extended or adjusted under 35 U.S.C. 154(b) by 1901 days.

(21) Appl. No.: 12/342,511

(22) Filed: Dec. 23, 2008

(51) Int. Cl.
*G06F 17/30* (2006.01)

(52) U.S. Cl.
CPC .............. *G06F 17/30082* (2013.01)

(58) Field of Classification Search
USPC ........................................ 707/640, 644, 654
See application file for complete search history.

(56) References Cited

U.S. PATENT DOCUMENTS

| | | |
|---|---|---|
| 2003/0074529 A1 | 4/2003 | Crohas |
| 2003/0216954 A1 | 11/2003 | Buzzelli |
| 2004/0054711 A1* | 3/2004 | Multer ........................ 709/201 |
| 2005/0070329 A1 | 3/2005 | Lection et al. |
| 2005/0191998 A1* | 9/2005 | Onyon et al. ................. 455/419 |
| 2006/0010270 A1* | 1/2006 | Zhang ............................ 710/74 |
| 2006/0069814 A1 | 3/2006 | Abraham et al. |
| 2007/0143307 A1 | 6/2007 | Bowers et al. |
| 2007/0180084 A1* | 8/2007 | Mohanty ...................... 709/223 |
| 2007/0186212 A1 | 8/2007 | Mazzaferri et al. |
| 2007/0198656 A1 | 8/2007 | Mazzaferri et al. |
| 2007/0201502 A1 | 8/2007 | Abramson |
| 2007/0204115 A1 | 8/2007 | Abramson |
| 2007/0232272 A1* | 10/2007 | Gonsalves et al. ......... 455/412.1 |
| 2007/0289000 A1 | 12/2007 | Weiss |
| 2008/0002658 A1* | 1/2008 | Soliman ....................... 370/343 |
| 2008/0082310 A1 | 4/2008 | Sandorfi et al. |
| 2008/0168072 A1* | 7/2008 | Freedman .................... 707/100 |
| 2008/0184125 A1 | 7/2008 | Suleiman et al. |
| 2009/0031006 A1 | 1/2009 | Johnson |
| 2009/0222655 A1 | 9/2009 | Martinent et al. |
| 2009/0292888 A1* | 11/2009 | Srivastava et al. ........... 711/162 |
| 2009/0298480 A1 | 12/2009 | Khambete et al. |

FOREIGN PATENT DOCUMENTS

WO    2008067432    6/2008

OTHER PUBLICATIONS

USPTO Office Action Summary mailed Nov. 17, 2010 from U.S. Appl. No. 11/945,524.
CNET Reviews; "Tritton WiFi NAS;" Nov. 26, 2007; 4 pages; http://reviews.cnet.com/external-hard-drives/tritton-wifi-nas/4505-3190_7-31149112.html?tag=mp.

(Continued)

*Primary Examiner* — Joshua Bullock

(57) ABSTRACT

A configuration message is received from a first computer system. In response to the configuration message, a first wireless device is enumerated on the first computer system as locally attached mass storage. A registration message is sent to a wireless network. File information about a shared file is received from a second wireless device. The second wireless device is enumerated on a second computer system as locally attached mass storage. A shared block of data is received from the second wireless device. The shared block of data is sent to the first computer system as data that is stored on a locally attached mass storage device.

20 Claims, 6 Drawing Sheets

(56) References Cited

OTHER PUBLICATIONS

Micro Anvika UK; "ASUS 40GB Wireless Hard Disk Drive," Nov. 26, 2007; 2 pages; http://www.microanvika.com/product.asp?TXT=INFO&PNO=ASU54305A&ref=sidebanner&cam=ASU54305A.

Belkin; "Wireless G USB Network Adapter," Nov. 26, 2007; 2 pages; http://catalog.belkin.com/IWCatProductPage.process?Product_Id=179211.

Memsen Corporation; "Mobile Interactive Marketing—Coming Soon!;" Nov. 26, 2007; 7 pages; http://www.memsen.com/datavendor_desc.htm.

Memsen Corporation; "Everybody has something to Share," Nov. 26, 2007; 1 page; http://www.memsen.com/index.htm.

* cited by examiner

WIRELESS DRIVE FILE BACKUP

RELATED APPLICATIONS

This application is related to U.S. patent application Ser. No. 11/945,524, titled "EMULATING A REMOVABLE MASS STORAGE DEVICE" filed on Nov. 27, 2007. This application is related to U.S. patent application Ser. No. 12/133,501, titled "PLUG-IN FILE SHARING" filed on Jun. 5, 2008. This application is related to U.S. patent application Ser. No. 12/190,701, titled "WIRELESS DRIVE FILE PEERING" filed on Aug. 13, 2008. This application is related to U.S. patent application Ser. No. 12/234,830, titled "USER LEVEL SECURITY FOR AN EMULATED REMOVABLE MASS STORAGE DEVICE" filed on Sep. 22, 2008.

TECHNICAL BACKGROUND

Small, lightweight, removable and rewritable storage devices are becoming more popular. These devices, such as Universal Serial Bus (USB) "keychain drives," USB flash drives, memory sticks, or flash memory cards offer advantages over floppy disks. They are smaller, faster, more reliable, and more durable than floppy disks. Their reliability and durability is typically a result of the fact that these drives have no moving parts.

To access or store data on a flash drive, the drive must be connected to a computer. Typically, this is done by plugging the device into a port built into the computer. These flash drives, like other plug-in devices, often can be connected and disconnected from the computer without opening the computer's enclosure. Once connected, the computer can then communicate with the flash drive using a mass storage standard. These standards are supported by many modern operating systems such as Windows and Linux. The plug-in connection may also supply power to the flash drive.

The Universal Serial Bus is defined in the Universal Serial Bus Specification, revision 1.1 and Universal Serial Bus Specification, revision 2.0 which are hereby incorporated herein by reference. These documents are available from the USB Implementers Forum web page at www.usb.org.

OVERVIEW

A file backup system is disclosed. A first wireless interface receives backup set data and first backup data from a wireless communication device that is enumerated as a first locally attached mass storage device by a first computer system. The backup set data comprises a backup file set. The backup file set indicates a first file. The first computer system comprises a first attached mass storage device storing the first file. The first file includes the first backup data. A first network carries the first backup data between the first wireless interface and a second network for storage by a mass storage system.

A method of operating a wireless device is disclosed. A wireless device is identified to a first computer system as a first locally attached mass storage. The wireless device being addable and removable from the first computer system without opening a case of the first computer system. The wireless device is configured to backup a first file. A directory on the first computer system indicates that the first file is on a second locally attached mass storage. In response to the wireless device being added to the first computer system, the wireless device is registered on a wireless network and the first file is sent to a mass storage system via the wireless network.

A method of backing up a file stored on a computer system is disclosed. A configuration message from the computer system is received. In response to the configuration message, a wireless device is enumerated on the computer system as locally attached mass storage. Backup configuration information that indicates the file to be backed up is received. A registration message is sent to a wireless network. At least a portion of the file is received from the computer system as data to be stored on the locally attached mass storage. The at least a portion of the file is sent to a mass storage system via the wireless network.

DETAILED DESCRIPTION

In an embodiment, files or folders are backed up automatically upon the connection of a wireless device. Upon insertion of the wireless device, files are copied from a configured location on the local computer to a predetermined network storage location. Every time the wireless device is connected, the process is executed. Security for the copied files is tied to the wireless device so no user action is required. Configuration of the files to be backed up may be stored on the wireless device or the local computer.

Figure 1:
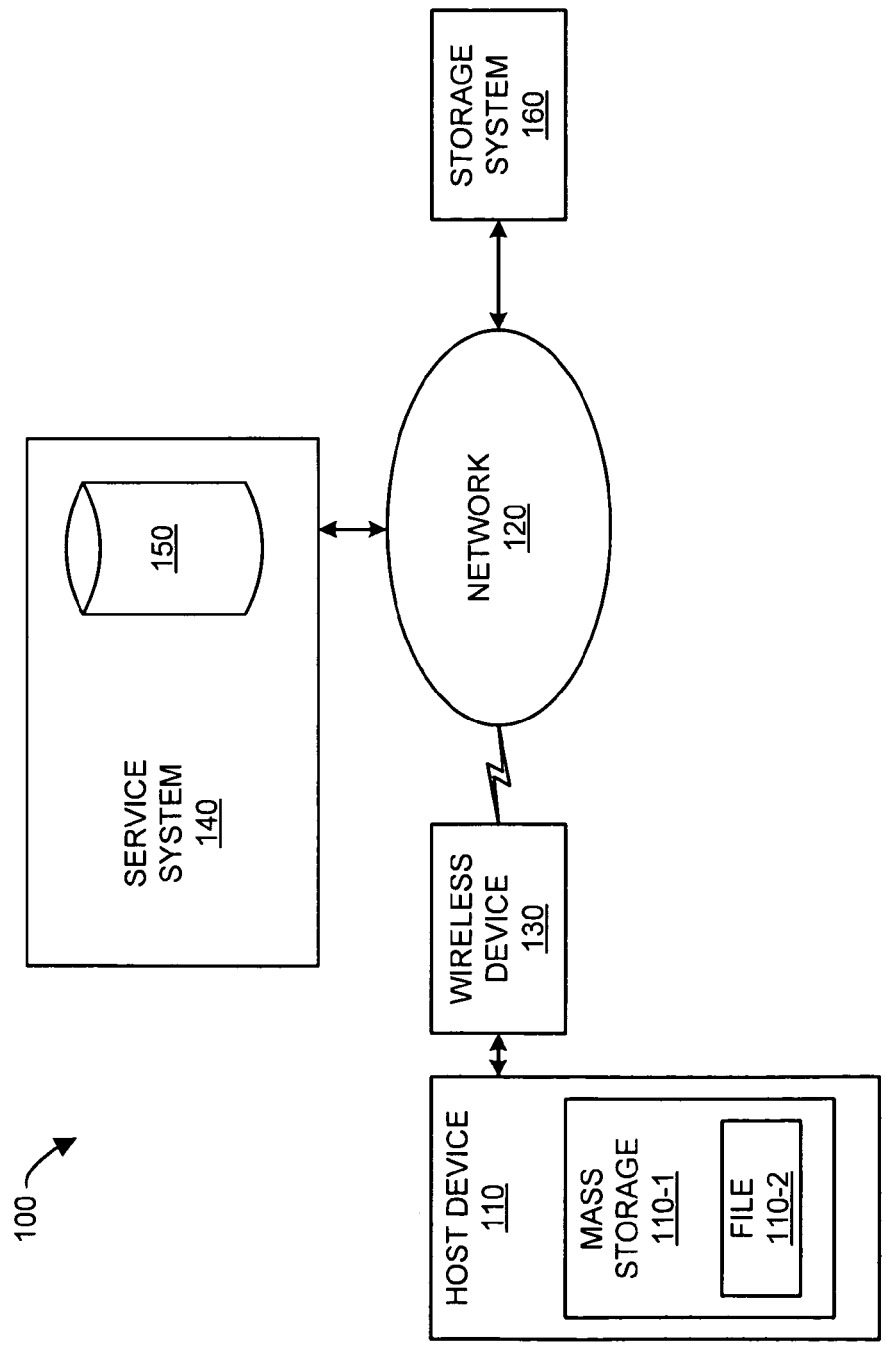
FIG. 1 is a block diagram illustrating a file backup system.

FIG. 1 is a block diagram illustrating a file backup system. In FIG. 1, communication system 100 comprises host device 110, wireless device 130, network 120, service system 140, and storage system 160. Service system 140 includes database 150. Host device 110 includes mass storage 110-1. Mass storage 110-1 includes file 110-2. Host device 110 is connected to wireless device 130. Wireless device 130 is operatively coupled to network 120 via a broadband wireless connection. Thus, host device 110 is operatively coupled to network 120.

Network 120 is operatively coupled to service system 140. Since service system 140 includes database 150, and network 120 is operatively coupled to service system 140, network 120 is operatively coupled to database 150.

Network 120 may be any network or collection of networks that couple, link, or otherwise operatively connect wireless device 130, service system 140, and storage system 160 with each other or other devices or systems. Network 120 may include other secondary data networks. In an example, network 120 may include a backhaul network, a local network, a long distance network, a packet network, the internet, or any combination thereof, as well as other types of networks.

In an example, communication network 120 may be, or include all or parts of an IEEE 802.16 (WiMAX) specified system. These parts may include a base station (BS); an access services network (ASN), access services network gateway (ASN-GW), or connectivity service network (CSN). In another example, service system 140 may also be a part of a WiMAX specified system.

Service system 140 may be any system or collection of systems, such as database 150, capable of storing and retrieving information about at least one of: (a) services provided by network 120; (b) services provided by or to networks or users connected to network 120; or, (c) configuration information for network 120. In an example, service system 140 is part of a CSN and performs authentication, authorization, and accounting operations. In another example, service system 140 is a device capabilities server (DCS) and provides information about wireless device 130. Service system 140 may manage user or device profiles for authentication (e.g., verifying device identifier, user name, or password).

Service system 140 may provide configuration information to network 120 that specifies a type of service to deliver, and policies to enforce that may restrict access by, or services provided to, wireless device 130. For example, when wireless device 130 first couples to network 120, wireless device 130 may send a registration message to network 120 asking for permission to use network 120 to communicate to other systems. The registration message may include a device identifier. Network 120 may then forward that registration message, along with a device identifier to service system 140. Service system 140 may then query database 150 with the device identifier to determine if wireless device 130 may use network 120. Service system 140 may then inform network 120 whether wireless device 130 may use network 120.

A device identifier may be one or more, but is not limited to, a mobile phone number, a mobile directory number (MDN), mobile identification number (MIN), electronic serial number (ESN), medium access control address (MAC address), or internet protocol address (IP address). Other types of device identifiers are also possible.

Service system 140 may also query database 150 to provide configuration information to network 120 that determines how wireless device 130 may use network 120. For example, service system 140 may configure network 120 to operatively couple wireless device 130 only to storage system 160. This configuration would prevent wireless device 130 from utilizing other services such as operatively coupling to internet servers for viewing web pages.

Service system 140 may also configure network 120 to process data coming from, or destined for, wireless device 130. For example, service system 140 may configure network 120 to translate packets received from wireless device 130 from one format or protocol to another before sending these translated packets to storage system 160. Likewise, service system 140 may configure network 120 to translate packets received from storage system 160 from one format or protocol to another before sending these translated packets to wireless device 130. It should also be understood that service system 140 may include additional elements not pictured for the sake of clarity.

Wireless device 130 may be any device, system, or other such communication platform capable of wirelessly communicating with network 120. Wireless device 130 may be, for example, a mobile phone, a wireless phone, a wireless modem, a wireless USB modem, a personal digital assistant (PDA), as well as other types of devices or systems that can communicate wirelessly with network 120.

Wireless device 130 may process enumeration or configuration requests to and from host device 110. For example, wireless device 130 may be connected to host device 110 via a USB port or other interface that can be connected and disconnected without opening the case of host device 110. To successfully communicate with each other, host device 110 and wireless device 130 may perform a USB enumeration process. This enumeration process is described in the Universal Serial Bus Specifications, revisions 1.1 and 2.0. In another embodiment, wireless device 130 may perform a different enumeration process. For example, wireless device 130 may perform a flash memory card enumeration process.

The enumeration process may also include a configuration process. To accomplish the configuration process, wireless device 130 may supply host device 110 with information about wireless device 130. One type of information that may be supplied to host device 110 by wireless device 130 is a device class. A device class helps inform host device 110 about the characteristics of wireless device 130. A device class may also help inform host device 110 about the protocols or capacities of wireless device 130. For example, wireless device 130 may inform host device 110 that it is a serial communication device, such as a modem.

In an embodiment, wireless device 130 informs host device 110 that wireless device 130 should be configured and controlled as a mass storage device. For example, wireless device 130 may, as part of a USB enumeration process, inform host device 110 that it should be enumerated as, and thus treated as, a USB Mass Storage Class (MSC) device. In another example, wireless device 130 may inform host device 110 that it should be enumerated as a removable mass storage device such as a flash memory card.

The USB Mass Storage Class is specified by the Universal Serial Bus Mass Storage Class Specification. The Universal Serial Bus Mass Storage Class Specification is a collection of documents that include the Universal Serial Bus Mass Storage Class Specification Overview, Revision 1.2; Universal Serial Bus Mass Storage Class Bulk-Only Transport, Revision 1.0; Universal Serial Bus Mass Storage Class Control/Bulk/Interrupt (CBI) Transport, Revision 1.1; Universal Serial Bus Mass Storage Class UFI Command Specification, Revision 1.0; Universal Serial Bus Mass Storage Specification For Bootability, Revision 1.0; and, the Universal Serial Bus Lockable Storage Devices Feature Specification, Revision 1.0. These documents are available from the USB Implementers Forum web page at www.usb.org.

As a result of wireless device 130 informing host device 110 that wireless device 130 should be configured and controlled as a mass storage device, host device 110 may treat wireless device 130 as a locally attached mass storage device. For example, host device 110 may enumerate wireless device 130 as a USB flash drive. That may mean that host device 110 would use portions of its operating system software, such as device drivers, intended to be used with a USB flash drive to configure, control, and communicate with wireless device 130. Host device 110 may use these portions of its operating system software even though wireless devices, in general, would normally be enumerated as communication devices.

If host device 110 is treating wireless device 130 as a locally attached mass storage device, it allows wireless device 130 to be treated as locally attached mass storage by non-driver parts of the operating system and applications. For example, if host device 110 were running a Windows XP operating system, wireless device 130 may appear under the "Devices with Removable Storage" heading of the "My Computer" folder. Alternatively, wireless device 130 may appear under the "Hard Disk Drives" heading of the "My Computer" folder.

Host device 110 may also use communication and configuration protocols intended for locally attached mass storage devices to communicate with wireless device 130. Wireless device 130 may emulate a mass storage device by also using the corresponding communication and configuration protocols to communicate with host device 110. For example, host device 110 may use Advanced Technology Attachment Packet Interface (ATAPI) command blocks and command sets to communicate with wireless device 130.

In another example, host device 110 may use the Small Computer System Interface (SCSI) commands to communicate with wireless device 130. Likewise, wireless device 130 may use SCSI commands to communicate with host device 110. In the preceding examples, these protocols may be encapsulated in USB packets for communication with wireless device 130 via a USB port on host device 110. Wireless device 130 may translate the communication and configuration protocols intended for locally attached mass storage devices into a format suitable for communication with storage system 160 via network 120.

Network 120 may process packets of data it exchanges with wireless device 130 via a wireless communication link. These packets of data may, for example, comprise data destined for storage system 160. These packets of data may be data retrieved from mass storage 110-1. This data may be data that sent to storage system 160. This data may be stored in a file 110-2 that is stored by mass storage 110-1.

Storage system 160 is computer data storage connected to a computer network providing data access to network clients. For example, storage system 160 may be a storage array network (SAN) or network attached storage (NAS). Storage system 160 may also be a part of network 120. Storage system 160 may comprise storage and a network that is separate from, but operatively coupled to, network 120.

In an embodiment, these packets of data exchanged between host device 110 and wireless device 130 may contain data with communication and configuration protocols intended for locally attached mass storage devices to communicate. For example, wireless device 130 may send, and network 120 may receive and process, packets of data with ATAPI command blocks and command sets. In another example, wireless device 130 may send, and network 120 may receive and process, SCSI commands. In another example, these protocols may be encapsulated in USB packets and wireless device 130 may send, and network 120 may receive and process these USB packets.

Host device 110 or wireless device 130 may process packets of data received from network 120 to translate them into data or commands for mass storage 110-1. Host device 110 or wireless device 130 may also process packets of data received from mass storage 110-1 to translate them into data or commands for network 120 or storage system 160. For example, host device 110 or wireless device 130 may translate packets of data received from wireless device 131 into commands or data that is understood by mass storage 110-1. Host device 110 or wireless device 130 may also translate packets of data received from mass storage 110-1 into data or commands for network 120 or storage system 160.

In an embodiment, network 120 and wireless device 130 are configured so that host device 110 may backup data stored on mass storage 110-1. The backup data may be stored in a file 110-2 stored by mass storage 110-1. The backup data may comprise a file, file system, or directory stored by mass storage 110-1. Thus, by plugging wireless device 130 into host device 110, host device 110 is able to copy data (in the form of a shared file 110-2 or directory) to storage system 160 via network 120 without further user input.

To copy the backup data, network 120 may associate one or more device identifiers with a shared file 110-2 file or a directory stored by mass storage 110-1. The device identifiers may be associated with wireless device 130. This association may also comprise backup information that details which files or directories are to be backed up by copying to storage system 160. Alternately, wireless device 130 may be configured with backup information (a.k.a. a backup set) that that details which files or directories are to be backed up by copying to storage system 160.

The device identifiers may act as a security component for access to the backup data stored by storage system 160. In other words, access to read or write the backed up file or directory may be limited to access by host devices that communicate using wireless device 130 which is associated only with particular device identifiers. Thus, access to read or write the backup copy of file 110-2 or directory depends upon a connection with wireless device 130 that has a device identifier that has been associated by network 120 with the backup copy of file 110-2.

In an embodiment, host device 110 may use wireless device 130 and network 120 to exchange backup data with storage system 160. Because wireless device 130 is enumerated as locally attached mass storage, host device 110 can exchange backup data with storage system 160 without the use of an extensive networking protocol stack or software.

Figure 2:
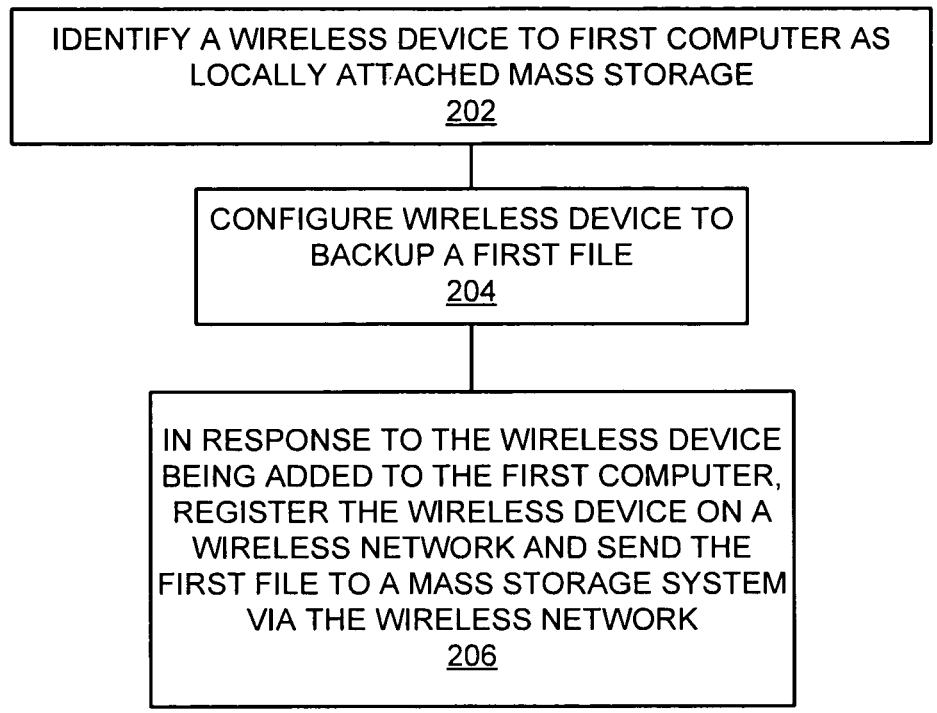
FIG. 2 is a flowchart illustrating a method of operating a communication system.

FIG. 2 is a flowchart illustrating a method of operating a wireless device. The steps illustrated in FIG. 2 may be performed by communication system 100.

A wireless device is identified to a first computer system as locally attached mass storage (202). For example, wireless device 130 may identify itself to host device 110 as a locally attached mass storage device. Wireless device 130 may inform host device 110 that wireless device 130 should be configured and controlled as a mass storage device. As a result, host device 110 may treat wireless device 130 as a locally attached mass storage device. For example, host device 110 may enumerate wireless device 130 as a USB flash drive. That may mean that host device 110 would use portions of its operating system software, such as device drivers, intended to be used with a USB flash drive to configure, control, and communicate with wireless device 130

A wireless device is configured to backup a first file (204). For example, host device 110 may store a file with backup configuration information. Wireless device 130 may read this configuration information shortly after it is connected to host device 110. In another example, host device 110 may write backup configuration information to wireless device 130. In another example, network 120 may send backup configuration information to wireless device 130. In another example, wireless device 130, network 120, or storage system 160 may store a file that causes a program to be automatically run. Information about the file to be run may be supplied to host 110 by wireless device 130. For example, USB mass storage class devices may store a file name "autorun.inf" that can specify a file to be executed, or other action taken, when the device is first connected and enumerated.

In response to the wireless device being added to the first computer, the wireless device is registered on a wireless network and the first file is sent to a mass storage system via the wireless network (206). For example, in response to wireless device 130 being added to host device 110, wireless device 130 may register itself on network 120. As part of this registration process, a MAC address given in the registration request may be associated by network 120 (or service system 140) with a uniform resource locator (URL) that specifies the file backup service offered by storage system 160. In another example, a MAC address may be associated with an internet protocol (IP) address and user datagram protocol (UDP) port number that provides the backup service offered by storage system 160. In another example, a URL identifies storage system 160 and a location (e.g., folder or directory) where backup information (or data) is to be stored and retrieved.

Continuing the example, host device 110 may send backup data from file 110-2 to storage system 160. This data, which may be in the form of a write request, may be sent by wireless device 130 to network 120. Network 120 may be configured to relay this request to storage system 160. Backup data may be retrieved from storage system 160 when host device 110 sends a read request to storage system 160.

Figure 3:
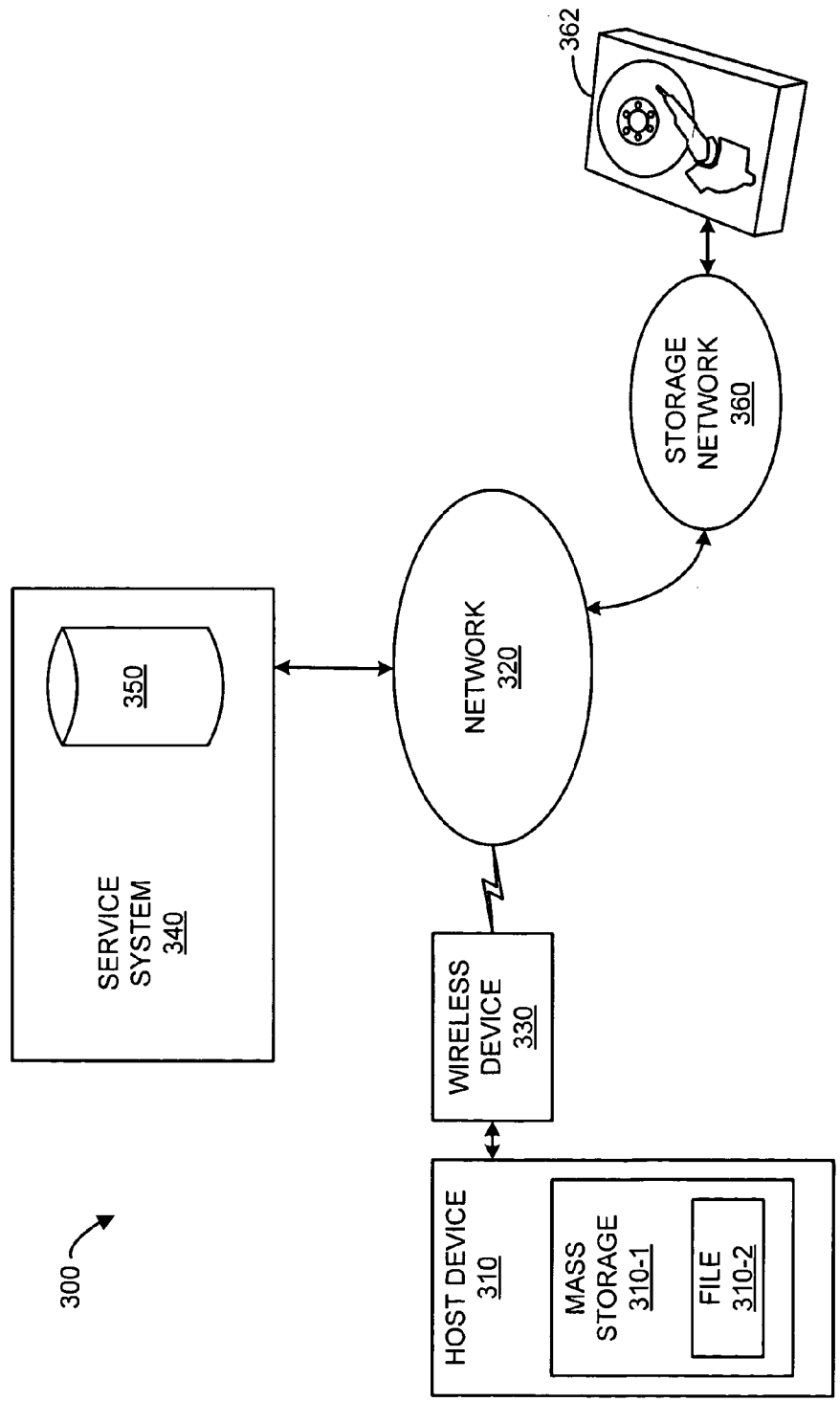
FIG. 3 is a block diagram illustrating a communication system for wireless file backup.

FIG. 3 is a block diagram illustrating a communication system for wireless file backup. In FIG. 3, communication system 300 comprises host device 310, wireless device 330, network 320, service system 340, storage network 360, and storage 362. Service system 340 includes database 350.

Host device 310 includes mass storage 310-1. Mass storage 310-1 includes shared file 310-2. Host device 310 is connected to wireless device 330. Wireless device 330 is operatively coupled to network 320 via a broadband wireless connection. Thus, host device 310 is operatively coupled to network 320.

Network 320 is operatively coupled to service system 340. Since service system 340 includes database 350, and network 320 is operatively coupled to service system 340, network 320 is operatively coupled to database 350. Network 320 is operatively coupled to storage network 360. Storage network 360 is operatively coupled to storage 362. Thus, host device 310 may be operatively coupled to storage 362 via wireless device 330, network 320, and storage network 360.

Network 320 may be any network or collection of networks that couple, link, or otherwise operatively connect wireless device 330 and storage network 360 with each other or other devices or systems and is also operatively coupled to service system 340. Network 320 may include other secondary data networks. In an example, network 320 may include a backhaul network, a local network, a long distance network, or a packet network, or any combination thereof, as well as other types of networks.

In an example, communication network 320 may be, or include all or parts of an IEEE 802.16 (WiMAX) specified system. These parts may include a base station (BS); an access services network (ASN), or connectivity service network (CSN). In another example, service system 340 may also be a part of a WiMAX specified system.

Service system 340 may be any system or collection of systems, such as database 350, capable of storing and retrieving information about at least one of: (a) services provided by network 320; (b) services provided by or to networks or users connected to network 320; or, (c) configuration information for network 320. In an example, service system 340 is part of a CSN and performs authentication, authorization, and accounting operations. In another example, service system 340 is a device capabilities server (DCS) and provides information about wireless device 330. Service system 340 may also manage user or device profiles for authentication (e.g., verifying device identifier, user name, or password).

Service system 340 may provide configuration information to network 320 that specifies a type of service to deliver, and policies to enforce that may restrict access by, or services provided to, wireless device 330. For example, when wireless device 330 first couples to network 320, wireless device 330 may send a registration message to network 320 asking for permission to use network 320 to communicate to other systems. The registration message may include a device identifier. Network 320 may then forward that registration message, along with a device identifier to service system 340. Service system 340 may then query database 350 with the device identifier to determine if wireless device 330 may use network 320. Service system 340 may then inform network 320 whether wireless device 330 may use network 320.

A device identifier may be one or more, but is not limited to, a mobile phone number, a mobile directory number (MDN), mobile identification number (MIN), electronic serial number (ESN), medium access control address (MAC address), or internet protocol address (IP address). Other types of device identifiers are also possible.

Service system 340 may also query database 350 to provide configuration information to network 320 that determines how wireless device 330 may use network 320. For example, service system 340 may configure network 320 to operatively couple wireless device 330 to file backup services provided by storage network 360. This configuration would prevent wireless device 330 from utilizing other services such as operatively coupling to internet servers for viewing web pages.

Service system 340 may also configure network 320 to process data coming from, or destined for, wireless device 330. For example, service system 340 may configure network 320 to translate packets received from wireless device 330 from one format or protocol to another before sending these translated packets to backup services provided by storage network 360. It should also be understood that service system 340 may include additional elements not pictured for the sake of clarity.

Wireless device 330 may be any device, system, or other such communication platform capable of wirelessly communicating with network 320. Wireless device 330 may be, for example, a mobile phone, a wireless phone, a wireless modem, a wireless USB modem, a personal digital assistant (PDA), as well as other types of devices or systems that can communicate wirelessly with network 320.

Wireless device 330 may process enumeration or configuration requests to and from host device 310. For example, wireless device 330 may be connected to host device 310 via a USB port. To successfully communicate with each other, host device 310 and wireless device 330 may perform a USB enumeration process. Wireless device 330 may process enumeration requests to and from host device 310. This enumeration process is described in the Universal Serial Bus Specifications, revisions 1.1 and 2.0. In another embodiment, wireless device 330 may perform a different enumeration process. For example, wireless device 330 may perform a flash memory card enumeration process.

The enumeration process may also include a configuration process. To accomplish the configuration process, wireless device 330 may supply host device 310 with information about wireless device 330. One type of information that may be supplied to host device 310 by wireless device 330 is a device class. A device class helps inform host device 310 about the characteristics of wireless device 330. A device class may also help inform host device 310 about the protocols or capacities of wireless device 330. For example, wireless device 330 may inform host device 310 that it is a serial communication device, such as a modem.

In an embodiment, wireless device 330 may inform host device 310 that wireless device 330 should be configured and controlled as a mass storage device. For example, wireless device 330 may, as part of a USB enumeration process, inform host device 310 that wireless device 330 should be enumerated as, and thus treated as, a USB Mass Storage Class (MSC) device. In another example, wireless device 330 may inform host device that it should be enumerated as a removable mass storage device such as flash memory cards.

The USB Mass Storage Class is specified by the Universal Serial Bus Mass Storage Class Specification. The Universal Serial Bus Mass Storage Class Specification is a collection of documents that include the Universal Serial Bus Mass Storage Class Specification Overview, Revision 1.2; Universal Serial Bus Mass Storage Class Bulk-Only Transport, Revision 1.0; Universal Serial Bus Mass Storage Class Control/Bulk/Interrupt (CBI) Transport, Revision 1.1; Universal Serial Bus Mass Storage Class UFI Command Specification, Revision 1.0; Universal Serial Bus Mass Storage Specification For Bootability, Revision 1.0; and, the Universal Serial Bus Lockable Storage Devices Feature Specification, Revision 1.0. These documents are available from the USB Implementers Forum web page at www.usb.org.

Because of wireless device 330 informing host device 310 that it should be configured and controlled as a mass storage device, host device 310 may treat wireless device 330 as a locally attached mass storage device. For example, host device 310 may enumerate wireless device 330 as a USB flash drive. That may mean that host device 310 would use portions of its operating system software, such as device drivers, intended to be used with a USB flash drive to configure, control, and communicate with wireless device 330. Host device 310 may use these portions of its operating system software even though wireless devices, in general, would normally be enumerated as communication devices.

If host device 310 is treating wireless device 330 as a locally attached mass storage device, it allows wireless device 330 to be treated as locally attached mass storage by non-driver parts of the operating system and applications. For example, if host device 310 were running a Windows XP operating system, wireless device 330 may appear under the "Devices with Removable Storage" heading of the "My Computer" folder. Alternatively, wireless device 330 may appear under the "Hard Disk Drives" heading of the "My Computer" folder.

Host device 310 may also use communication and configuration protocols intended for locally attached mass storage devices to communicate with wireless device 330. Wireless device 330 may emulate a mass storage device by also using the corresponding communication and configuration protocols to communicate with host device 330. Host device 310 may use Advanced Technology Attachment Packet Interface (ATAPI) command blocks and command sets to communicate with wireless device 330. Likewise, wireless device 330 may use ATAPI command blocks and command sets to communicate with host device 310.

In another example, host device 310 may use the Small Computer System Interface (SCSI) commands to communicate with wireless device 330. Likewise, wireless device 330 would use SCSI commands to communicate with host device 310. In the preceding examples, these protocols may be encapsulated in USB packets for communication with wireless device 330 via a USB port on host device 310. Wireless device 330 may translate the communication and configuration protocols intended for locally attached mass storage devices into a format suitable for communication with wireless device 330 via network 320.

Network 320 may process packets of data it exchanges with wireless device 330 via a wireless communication link. These packets of data may, for example, comprise backup data destined for backup service provided by storage network 360. These packets of backup data may be data retrieved from mass storage 310-1. This data may be data that is eventually stored on storage 362.

In an embodiment, these packets of backup data may contain communication and configuration protocols intended for locally attached mass storage devices to communicate. For example, wireless device 330 may send, and network 320 may receive and process, packets of backup data with ATAPI command blocks and command sets. In another example, wireless device 330 may send, and network 320 may receive and process, SCSI commands. In another example, these protocols may be encapsulated in USB packets and wireless device 330 may send, and network 320 may receive and process these USB packets.

Host device 310 or wireless device 330 may process packets of data received from network 320 to translate them into data or commands mass storage 310-1. Host device 310 or wireless device 330 may also process packets of data received from mass storage 310-1 to translate them into data or commands for network 320 or storage network 360.

In an embodiment, network 320 is configured so that host device 310 may backup data stored by mass storage 310-1 on storage network 360. The backup data may be stored in file 310-2 by mass storage 310-1. The backup data may be file systems or directories stored by mass storage 310-1. Thus, by plugging wireless device 330 into host device 310, host device 310 is able to backup data to storage network 360 without further user input.

To access the backup services provided by storage network 360, network 320 may associate one or more device identifiers with file 310-2. The device identifiers may be associated with wireless device 330. The device identifiers may act as a security component for access to the backup data or backup services. In other words, access to the backup file or directory on storage network 360 may be limited to access by host devices that communicate using a wireless device (such as wireless device 330) associated with particular device identifiers. Thus, access to the backup copy of file 310 depends upon a connection with a wireless device with a device identifier that has been associated with the file or directory by network 320.

In an embodiment, host device 310 may use wireless device 330 and network 320 to backup data to storage network 360. Because wireless device 330 is enumerated as locally attached mass storage, host device 310 can utilize the backup services provided by storage network 360 without the use of an extensive networking protocol stack or software.

Figure 4:
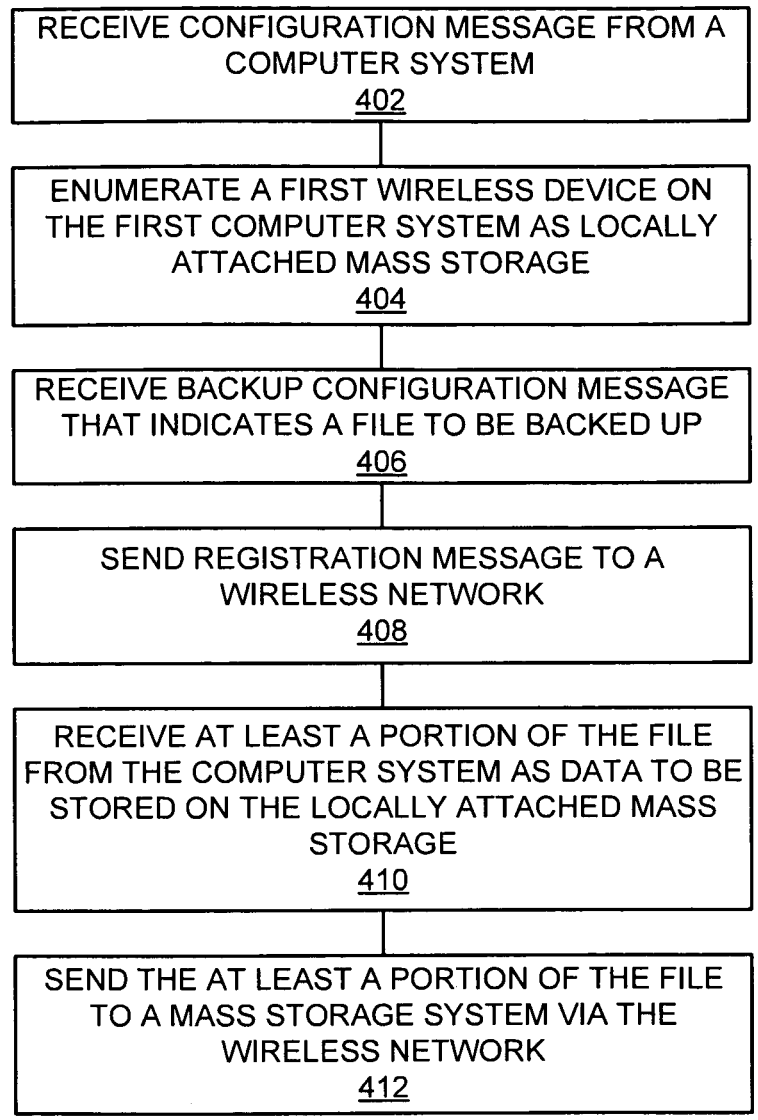
FIG. 4 is a flowchart illustrating a method of backing up files wirelessly.

FIG. 4 is a flowchart illustrating a method of backing up files wirelessly. The steps illustrated in FIG. 4 may be performed by one or more elements of communication system 100 or communication system 300.

A configuration message is received from a computer system (402). For example, wireless device 330 may receive a configuration message from host device 310. A first wireless device is enumerated on the first computer system as a locally attached mass storage device (404). For example, wireless device 330 may identify itself to host device 310 as a mass storage device. As a result, host device 310 may enumerate wireless device 330 as a locally attached mass storage device. Host device 310 may then use communication messages and protocols associated with mass storage devices to communicate with wireless device 330.

A backup configuration message is received that indicates a file to be backed up (406). For example, host device 310 may send backup configuration information stored on mass storage 310-1 to wireless device 330. In another example, backup configuration information may be sent from service system 340 to wireless device 330. This backup configuration information may be associated with a device identifier provided by wireless device 330 to network 320.

A registration message is sent to a wireless network (408). For example, wireless device 330 may send a registration message to network 320. Information in this registration message may be used by network 320 or service system 340 to connect wireless device 330 with a backup service provided by storage network 360. For example, information in this registration message (such as a device identifier) may be used by network 320 or service system 340 to connect wireless device 330 to storage network 360 so that data stored in file 310-2 may be copied to storage 362. In another example, information in this registration message may be used by network 320 or service system 340 to connect wireless device 330 to storage network 360 so that backup data stored in storage 362 may be restored to files 310-2.

At least a portion of the file is received from the computer system as data to be stored on the locally attached mass storage (410). For example, host system 310 may copy at least a portion of file 310-2 to the locally attached mass storage device that wireless device 330 is emulating. The at least a portion of the file is sent to a mass storage system via the wireless network (410). For example, wireless device 330 may send the portion of file 310-2 that it received in block 410 to a file backup service provided by storage network 360.

Figure 5:
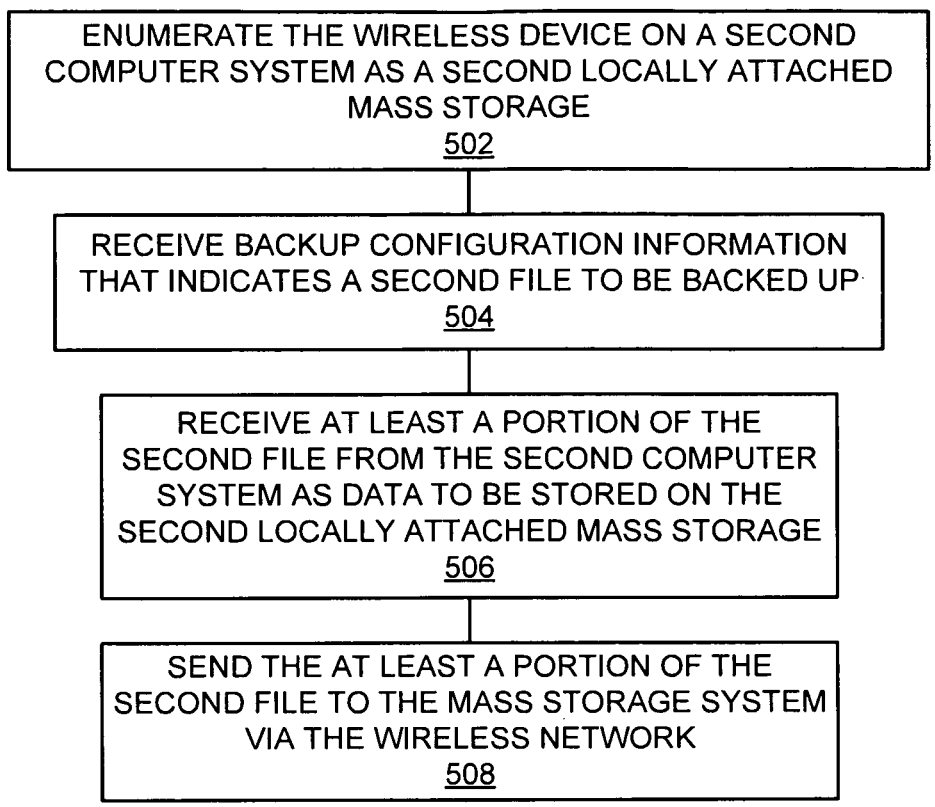
FIG. 5 is a flowchart illustrating a method a method of backing up files wirelessly on a multiple computers.

FIG. 5 is a flowchart illustrating a method a method of backing up files wirelessly on a multiple computers. The steps illustrated in FIG. 5 may be performed by one or more elements of communication system 100 or communication system 300.

The wireless device is enumerated on a second computer system as second locally attached mass storage (502). For example, wireless device 330 may identify itself to a second host device as a locally attached mass storage device. As a result, the second host device may enumerate wireless device 330 as a second locally attached mass storage device. The second host device may then use communication messages and protocols associated with mass storage devices to communicate with wireless device 330.

Backup configuration information that indicates a second file to be backed up is received (504). For example, the second host device may send backup configuration information it has stored to wireless device 330. In another example, backup configuration information may be sent from service system 340 to wireless device 330. This backup configuration information may be associated with a device identifier provided by wireless device 330 to network 320.

At least a portion of the second file is received from the second computer system as data to be stored on the second locally attached mass storage (506). For example, the second host system may copy at least a portion of the second file to the second locally attached mass storage device that wireless device 330 is emulating. The at least a portion of the second file is sent to a mass storage system via the wireless network (508). For example, wireless device 330 may send the portion of second file that it received in block 506 to a file backup service provided by storage network 360.

In an embodiment, storage network 360 may store the backup data it receives from wireless device 330 in separate locations for each host device. Network 320 or storage network 360 may determine where to store the backup data received based on a device identifier associated with the host device. In another embodiment, storage network may overwrite the backup data received from one host device with data received from another host device. Network 320 or storage network 360 may determine whether to overwrite stored backup data based on a device identifier associated with the host device(s).

The methods, systems, networks, databases, and devices described above may be implemented with or executed by one or more computer systems. The methods described above may also be stored on a computer readable medium. Many of the elements of communication network 100 and communication network 300 may be, comprise, or include computers systems. This includes, but is not limited to communication system 100, host device 110, wireless device 130, network 120, service system 140, database 150, storage system 160, communication system 300, host device 310, wireless device 330, network 320, service system 340, database 350, storage network 360, and storage 362.

Figure 6:
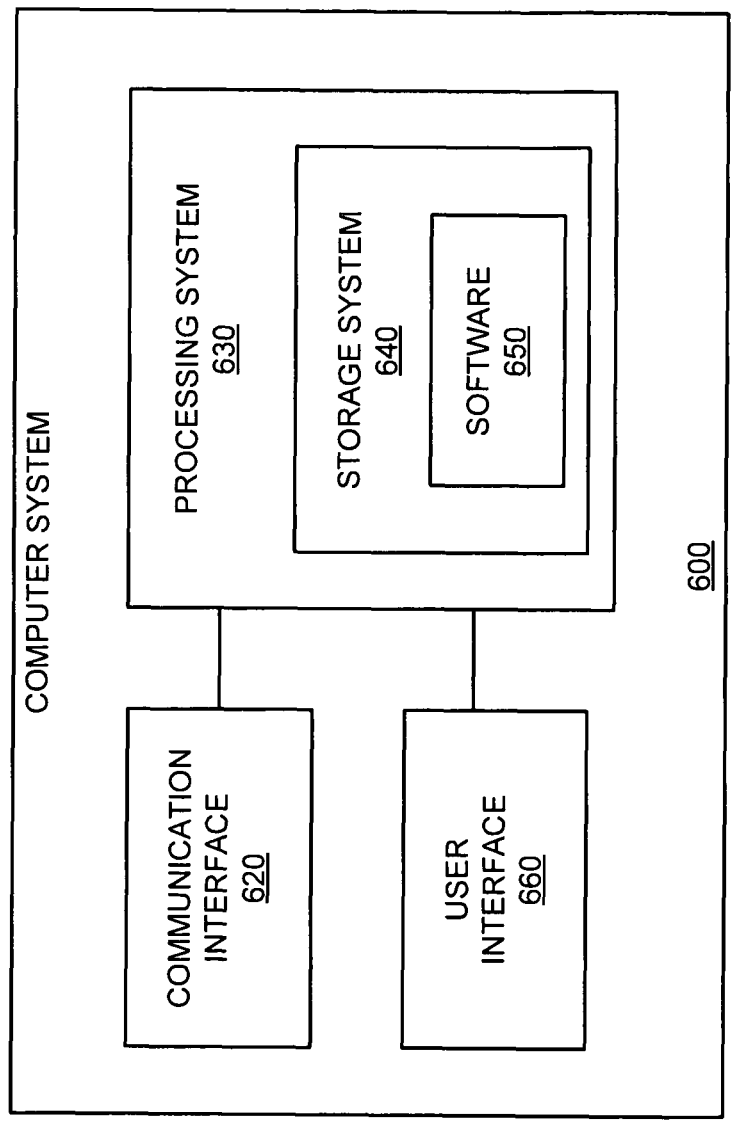
FIG. 6 is a block diagram illustrating a computer system.

FIG. 6 illustrates a block diagram of a computer system. Computer system 600 includes communication interface 620, processing system 630, and user interface 660. Processing system 630 includes storage system 640. Storage system 640 stores software 650. Processing system 630 is linked to communication interface 620 and user interface 660. Computer system 600 could be comprised of a programmed general-purpose computer, although those skilled in the art will appreciate that programmable or special purpose circuitry and equipment may be used. Computer system 600 may be distributed among multiple devices that together comprise elements 620-660.

Communication interface 620 could comprise a network interface, modem, port, transceiver, or some other communication device. Communication interface 620 may be distributed among multiple communication devices. Processing system 630 could comprise a computer microprocessor, logic circuit, or some other processing device. Processing system 630 may be distributed among multiple processing devices. User interface 660 could comprise a keyboard, mouse, voice recognition interface, microphone and speakers, graphical display, touch screen, or some other type of user device. User interface 660 may be distributed among multiple user devices. Storage system 640 may comprise a disk, tape, integrated circuit, server, or some other memory device. Storage system 640 may be distributed among multiple memory devices.

Processing system 630 retrieves and executes software 650 from storage system 640. Software 650 may comprise an operating system, utilities, drivers, networking software, and other software typically loaded onto a computer system. Software 650 may comprise an application program, firmware, or some other form of machine-readable processing instructions. When executed by processing system 630, software 650 directs processing system 630 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of backing up a file stored on a computer system, the method comprising:
   receiving a configuration message from the computer system;
   in response to the configuration message, instructing the computer system to enumerate a wireless device connected to the computer system as a locally attached mass storage device;
   receiving backup configuration information that indicates the file to be backed up;
   wirelessly transmitting a registration message to a communication network, wherein the communication network authenticates the wireless device and establishes a wireless communication link between the wireless device and the communication network in response to the registration message;
   receiving at least a portion of the file from the computer system and backup instructions to store the file in the locally attached mass storage device; and
   wirelessly transmitting the at least a portion of the file for delivery to a network storage system via the communication network.

2. The method of claim 1, further comprising:
   receiving an authentication message transmitted from the communication network indicating that the file may be sent to the network storage system via the wireless communication link.

3. The method of claim 1 wherein instructing the computer system to enumerate the wireless device as the locally attached mass storage device comprises the wireless device providing a device class to the computer system that informs the computer system of a protocol of the locally attached mass storage device.

4. The method of claim 1, further comprising, in the communication network, associating the wireless device with the network storage system based on a device identifier that identifies the wireless device.

5. The method of claim 4 wherein associating the wireless device with the network storage system comprises operatively coupling the wireless device to the network storage system and preventing the wireless device from utilizing other services provided by the communication network.

6. The method of claim 1, further comprising, in response to the backup configuration information, requesting the file and the backup instructions from the computer system.

7. The method of claim 1, further comprising, in the communication network, associating a device identifier of the wireless device with the file stored in the network storage system.

8. A wireless communication device comprising:
   a wireless communication transceiver configured to wirelessly transmit a registration message to a communication network, wherein the communication network is configured to authenticate the wireless device and establish a wireless communication link between the wireless device and the communication network in response to the registration message;
   a communication transceiver configured to connect to a computer system and receive a configuration message from the computer system; and
   a processing system configured to, in response to the configuration message, instruct the computer system to enumerate the wireless communication device connected to the computer system as a locally attached mass storage device;
   the communication transceiver further configured to receive backup configuration information that indicates a file to be backed up, and receive at least a portion of the file from the computer system and backup instructions to store the file in the locally attached mass storage device;
   the wireless communication transceiver further configured to wirelessly transmit the at least a portion of the file for delivery to a network storage system via the communication network.

9. The wireless communication device of claim 8 further comprising the wireless communication transceiver configured to receive an authentication message transmitted from the communication network indicating that the file may be sent to the network storage system via the wireless communication link.

10. The wireless communication device of claim 8 wherein the processing system configured to instruct the computer system to enumerate the wireless communication device as the locally attached mass storage device comprises the processing system configured to provide a device class to the computer system that informs the computer system of a protocol of the locally attached mass storage device.

11. The wireless communication device of claim 8 wherein the communication network is configured to associate the wireless communication device with the network storage system based on a device identifier that identifies the wireless communication device.

12. The wireless communication device of claim 11 wherein the communication network configured to associate the wireless communication device with the network storage system comprises the communication network configured to operatively couple the wireless communication device to the network storage system and prevent the wireless communication device from utilizing other services provided by the communication network.

13. The wireless communication device of claim 8 further comprising the processing system configured to, in response to the backup configuration information, request the file and the backup instructions from the computer system.

14. The wireless communication device of claim 8 wherein the communication network is configured to associate a device identifier of the wireless communication device with the file stored in the network storage system.

15. A system to back up a file stored on a computer system, the system comprising:
   a service system in a communication network; and
   a wireless device configured to wirelessly transmit a registration message to the service system;
   the service system configured to authenticate the wireless device and establish a wireless communication link between the wireless device and the communication network in response to the registration message;
   the wireless device configured to receive a configuration message from the computer system and in response to the configuration message, instruct the computer system to enumerate the wireless device connected to the computer system as a locally attached mass storage device, receive backup configuration information that indicates the file to be backed up, receive at least a portion of the file from the computer system and backup instructions to store the file in the locally attached mass storage device, and in response to the backup instructions, wirelessly transmit the at least a portion of the file for delivery to a network storage system via the communication network.

16. The system of claim 15 further comprising the wireless device configured to receive an authentication message transmitted from the communication network indicating that the file may be sent to the network storage system via the wireless communication link.

17. The system of claim 15 wherein the wireless device configured to instruct the computer system to enumerate the wireless device as the locally attached mass storage device comprises the wireless device configured to provide a device class to the computer system that informs the computer system of a protocol of the locally attached mass storage device.

18. The system of claim 15 wherein the service system is configured to associate the wireless device with the network storage system based on a device identifier that identifies the wireless device.

19. The system of claim 18 wherein the service system configured to associate the wireless device with the network storage system comprises the service system configured to operatively couple the wireless device to the network storage system and prevent the wireless device from utilizing other services provided by the communication network.

20. The system of claim 15 further comprising the wireless device configured to, in response to the backup configuration information, request the file and the backup instructions from the computer system.

\* \* \* \* \*